United States Patent
Altmann

(10) Patent No.: US 12,548,091 B2
(45) Date of Patent: Feb. 10, 2026

(54) METHOD AND SYSTEM FOR OPTICAL ENCODING METERING

(71) Applicant: Eran Altmann, Haifa (IL)

(72) Inventor: Eran Altmann, Haifa (IL)

(73) Assignee: Eran Altmann, Haifa (IL)

( * ) Notice: Subject to any disclaimer, the term of this patent is extended or adjusted under 35 U.S.C. 154(b) by 396 days.

(21) Appl. No.: 18/351,505

(22) Filed: Jul. 13, 2023

(65) Prior Publication Data

US 2024/0020776 A1 Jan. 18, 2024

(30) Foreign Application Priority Data

Jul. 13, 2022 (IL) .......................................... 294751

(51) Int. Cl.
*G06Q 50/06* (2024.01)
*G06V 30/10* (2022.01)

(52) U.S. Cl.
CPC ............. *G06Q 50/06* (2013.01); *G06V 30/10* (2022.01)

(58) Field of Classification Search
CPC .............................. G06Q 50/06; G06V 30/10
USPC ........................................................ 340/603
See application file for complete search history.

(56) References Cited

U.S. PATENT DOCUMENTS

| | | | |
|---|---|---|---|
| 6,853,309 B1 | 2/2005 | Schroeter | |
| 10,444,033 B2 | 10/2019 | Maman et al. | |
| 2007/0057814 A1* | 3/2007 | Goldberg | G01D 4/002 340/870.02 |
| 2011/0121989 A1* | 5/2011 | Roslak | H04Q 9/00 382/182 |
| 2014/0160297 A1* | 6/2014 | Dondurur | H04L 12/2823 348/160 |
| 2015/0003665 A1* | 1/2015 | Kumar | G06V 20/52 382/100 |
| 2015/0084785 A1* | 3/2015 | Lesbirel | G01D 4/008 340/870.02 |
| 2017/0314962 A1* | 11/2017 | Blackwell | H04L 67/125 |
| 2017/0364734 A1 | 12/2017 | Melugin et al. | |
| 2019/0297395 A1* | 9/2019 | Huang | H04N 7/183 |
| 2019/0310107 A1 | 10/2019 | Brainard | |

OTHER PUBLICATIONS

David Shamah, "Sabbath-observant meter keeps water flowing 24/7", The Times of Israel, Oct. 27, 2013, published on: https://www.timesofisrael.com/sabbath-observant-meter-keeps-water-flowing-247/.

Search Report for Israel Patent Application No. 294751, mailed Oct. 3, 2022.

* cited by examiner

*Primary Examiner* — Kerri L Mcnally
(74) *Attorney, Agent, or Firm* — PEARL COHEN ZEDEK LATZER BARATZ LLP

(57) ABSTRACT

Systems and methods for metering consumption of a resource include: a sensor comprising a display and configured to: sense a consumption of the resource; display said consumption on the display; and convert said consumption into digital sensor data; an imaging device configured to capture images of the display of the sensor; and a communications interface configured to transmit the digital sensor data and data describing one or more of the images of the display to a remote server.

11 Claims, 3 Drawing Sheets

METHOD AND SYSTEM FOR OPTICAL ENCODING METERING

CROSS REFERENCE TO RELATED APPLICATION

This application claims priority from Israeli Patent Application No. 294751, filed Jul. 13, 2022, which is incorporated herein by reference in its entirety.

FIELD OF THE INVENTION

The invention relates generally to optical encoding methods for meters and, in particular, to smart water meters, possibility capable of including continuous sampling and/or digital data interface methodology.

BACKGROUND OF THE INVENTION

Many households, businesses and buildings have one or more meters for measuring consumption of resources such as water, electricity, heating and cooling, and gas. These meters are increasingly installed as, or upgraded to be, so-called "smart" meters, which continuously/periodically sample the consumption of the resource and relay accumulated data to a central server for analysis, billing, and expected future usage. The mechanisms behind such smart meters are electronically driven, and thus are susceptible to inaccuracies due to, for example, battery depletion and maintenance. Such continuously sampling meters are also not in conformity with certain religious holidays, such as the Jewish Shabbat or the Sabbath, during which any form of work or deliberate activity that is not related to a life-threatening medical emergency is prohibited; some Jewish authorities consider the use of electricity to constitute work.

SUMMARY OF THE INVENTION

Advantages of the invention may include a "Shabbat Kosher" system and method for metering consumption of a resource that adapts from continuous sampling to optical encoding for a predetermined and/or on demand period of time.

According to one or more embodiments, a system for metering consumption of a resource includes: a sensor including a display and configured to: sense a consumption of the resource; display the consumption on the display; and convert the consumption into digital sensor data; an imaging device configured to capture images of the display of the sensor; and a communications interface configured to transmit the digital sensor data and data describing one or more of the images of the display to a remote server.

According to some embodiments, the system includes a processor configured to extract a consumption from one or more images of the display, wherein the data describing one or more of the images of the display includes the extracted consumption.

According to some embodiments, the remote server is configured to extract a consumption from the data describing one or more images of the display.

According to some embodiments, the remote server is configured to extract a consumption from the data describing one or more images of the display using an optical character recognition (OCR) algorithm.

According to some embodiments, the optical character recognition (OCR) may be implemented into the field end point and may include the possibility of transmitting the processed data to the remote server.

According to some embodiments, the sensing module is configured to continuously detect a consumption of the resource.

According to some embodiments, continuous conversion of the detected consumption by the sensing module into digital data can be paused for a predetermined interval.

According to some embodiments, the imaging device is configured to image the display at an end of the predetermined interval.

According to some embodiments, the remote server is configured to calculate a consumption of the resource during the predetermined interval based on the digital sensor data received before the predetermined interval and an image of the display at the end of the predetermined interval.

According to some embodiments, the communications interface transmits the digital sensor data to the remote server at least once a day.

According to some embodiments, the system is coupled to an existing resource consumption meter.

According to one or more embodiments, a method for resource consumption metering includes: detecting a consumption of a resource; displaying the consumption on a display; converting the consumption into digital sensor data; imaging the display; and transmitting the digital sensor data and data describing one or more of the images of the display to a remote server.

According to some embodiments, the method includes extracting a consumption from one or more images of the display, wherein the data describing one or more of the images of the display includes the extracted consumption.

According to some embodiments, the remote server is configured to extract a consumption from the data describing one or more images of the display.

According to some embodiments, the remote server is configured to extract a consumption from the data describing one or more images of the display using an optical character recognition (OCR) algorithm.

According to some embodiments, the resource is one of gas, electricity, or water, or energy or heating and/or cooling.

According to some embodiments, a method includes continuously detecting a consumption of the resource.

According to some embodiments, a method includes pausing the continuous detection for a predetermined interval.

According to some embodiments, a method includes imaging the display at an end of the predetermined interval.

According to some embodiments, a method includes calculating a consumption of the resource during the predetermined interval based on the digital sensor data received before the predetermined interval and an image of the display at the end of the predetermined interval.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanying drawings. Embodiments are illustrated without limitation in the figures, in which like reference numerals indicate corresponding, analogous, or similar elements, and in which:

Figure 1:
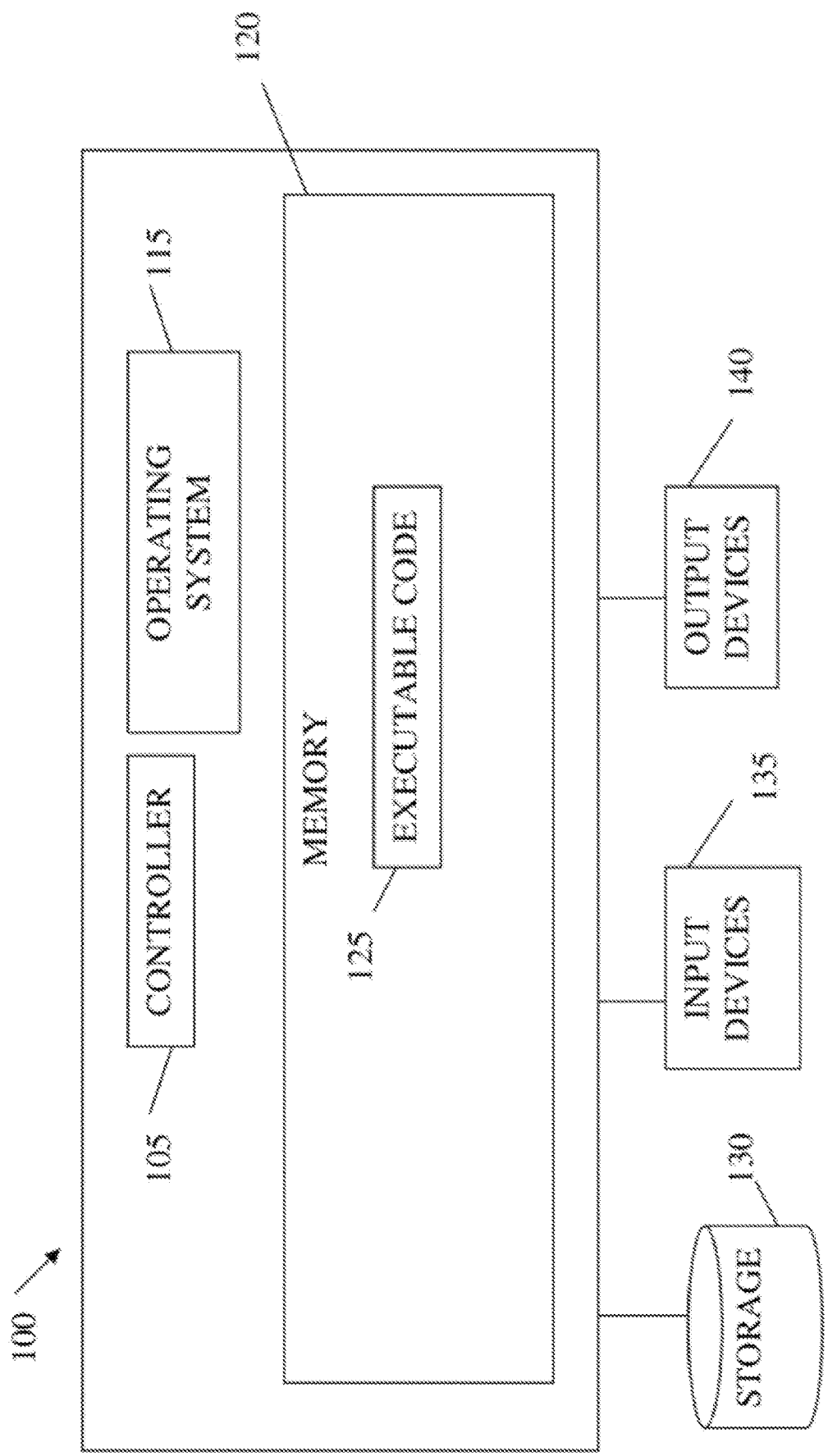
FIG. 1 is a block diagram of a computing device, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

FIG. 1 shows a block diagram of an exemplary computing device which may be used with embodiments of the present invention. Computing device 100 may include a controller or computer processor 105 that may be or may include, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. At least a portion of Memory 120 may include data storage housed online on the cloud. Memory 120 may be or may include a plurality of different memory units. Memory 120 may store for example, instructions (e.g., code 125) to carry out a method as disclosed herein. Memory 120 may use a datastore, such as a database.

Executable code 125 may be any application, program, process, task, or script. Executable code 125 may be executed by controller 105 possibly under control of operating system 115. For example, executable code 125 may be, or may execute, one or more applications performing methods as disclosed herein, such as a machine learning model, or a process providing input to a machine learning model. In some embodiments, more than one computing device 100 or components of device 100 may be used. One or more processor(s) 105 may be configured to carry out embodiments of the present invention by, for example, executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105. Storage 130 may include cloud storage. Storage 130 may include storing data in a database.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g., memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 2:
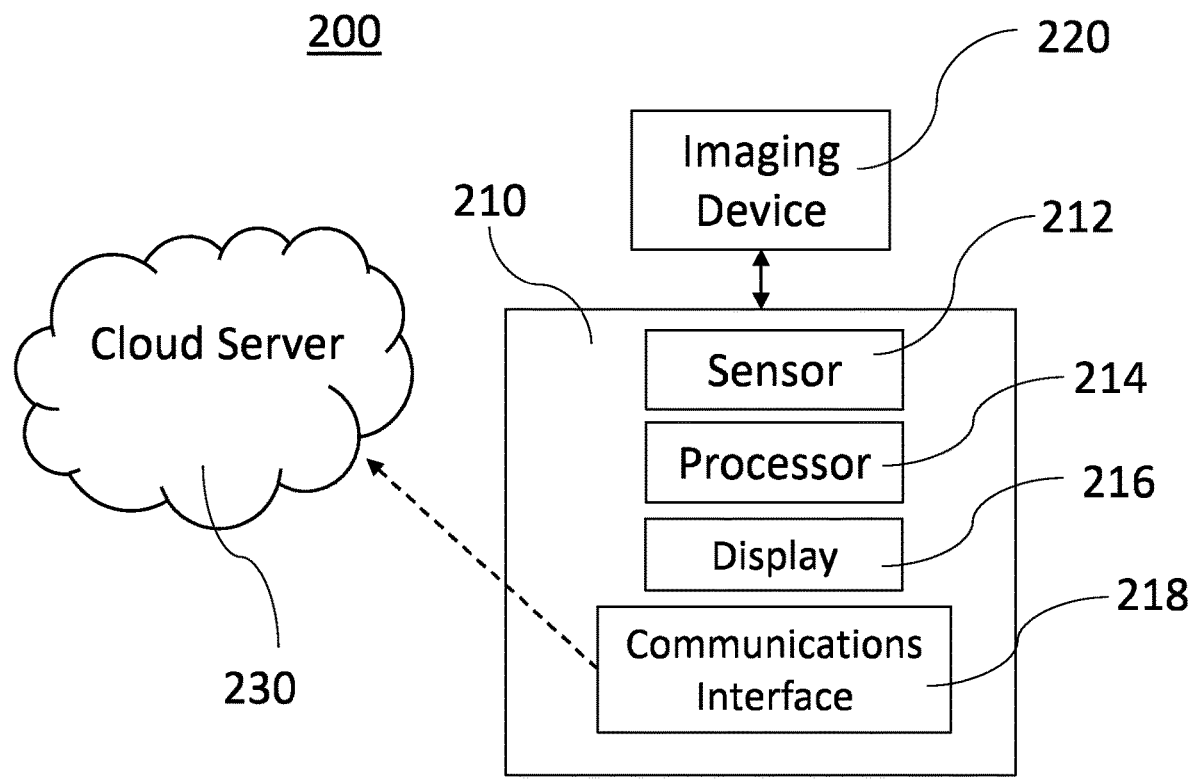
FIG. 2 is a block diagram of a system, according to some embodiments of the invention.

FIG. 2 shows a block diagram of a system 200, according to some embodiments of the invention. System 200 may be referred to as an optical encoder or photo-coder. According to some embodiments, system 200 is coupled/added, e.g., retrofitted, to an existing meter, such as an already installed water meter.

System 200 may include a meter 210, an imaging device 220 and a cloud server 230. Imaging device 220 may be in operative communication with meter 210.

Meter 210 may include a sensor 212, a processor 214, a display 216 and/or a communications interface 218.

Sensor 212 may sense, measure, or otherwise detect a consumption of a resource, such as water, gas, electricity, heating & cooling, energy, etc. Sensor 212 may comprise an electronic data capture unit (EDC), a modular-disc rotation sensor, a REED switch, inductive disc, hall effect sensor, optic sensor, movement sensor, and/or mechanical switch.

Sensor 212 may be in operative communication with processor 214 and display 216.

Processor 214 may be or may include a computing device such as computing device 100 shown in FIG. 1. Processor 214 may control operation of system 200, for example via an operating system 115 as shown in FIG. 1 which may schedule operation of imaging device 220 and/or communications interface 218. Processor 214 may receive signals describing sensed consumption of a resource from sensor 212 and may convert the signals describing sensed consumption into digital sensor data. The digital sensor data may be stored in a memory of processor 214, such as a memory 120 and or storage 130 show in FIG. 1. Processor 214 may be in operative communication with sensor 212, display 216, communications interface 218, and imaging device 220.

Processor 214 may control sensor 212 so as to collect sensor readings continually, e.g., to operate sensor 212 in a continuous sampling mode. In some embodiments, continuous converting of the signals describing sensed consumption into digital sensor data may be paused for a predetermined interval of time or on demand/on event, such as a minute, an hour or a few days, etc. Continuous conversion of the signals may be paused intentionally, such as for maintenance or to observe religious holidays, and/or continuous conversion may be paused unintentionally, such as due to power supply to the meter failing, e.g., a dead battery. It is understood that while the conversion of the signals is paused, the sampling by the sensor continues, and so the display also continues to show the readings of the sensor.

Display 216 may display a sensed consumption, e.g., a consumption sensed by sensor 212. Display 216 may display digital sensor data converted by processor 214 from a sensed consumption. Display 216 may an electronic display such as comprised of a number of seven-segment display LEDs, or a dot matrix display. In some embodiments, display 216 is a mechanical display, such as a vane display.

Communications interface 218 may be an NB-IOT (Narrow band internet of things) device or other types of communications technology (e.g., cellular, multi-mode, LoRaWAN, LPWAN (long range, wide area network), Radio Frequency (RF) communication, and/or wired communication). Communications interface 218 may send, e.g., transmit, data to a remote server, such as a cloud based server 230. Communications interface 218 may send digital sensor data and data describing one or more images captured by imaging device 220 to cloud server 230. Data describing one or more images of the display may include the images themselves, and/or an extracted consumption (e.g., meter reading) extracted by a processor of system 200, such as processor 214. The meter reading or consumption may be extracted using an optical character recognition (OCR) algorithm.

Communications interface 218 may transmit data and/or images to cloud server with a predetermined time frequency, such as once a day or as frequently as required. The frequency with which communications interface 218 sends data and/or images to the remote server 230 may be determined by processor 214, for example pre-programmed as executable code 125 shown in FIG. 1.

Imaging device 220 may be configured to capture images of display 216 of the meter 210. Images captured by imaging device 220 may optically or photographically encode a meter reading shown on display 216. In some embodiments, this meter reading may be decoded, for example by processor 214, so as to extract a consumption and/or reading from the image. Imaging device 220 may be any imaging device known in the art, such as a camera or video camera. Imaging device 220 may include one or more charge coupled devices (CCDs) and/or active pixel sensors (APS) such as a complementary metal-oxide-semiconductor (CMOS) sensor. Imaging device 220 may be in operative communication with processor 214. Processor 214 may control how often imaging device 220 captures images of display 216. For example, processor 214 may instruct imaging device 220 to capture an image of display 216 once every four hours. It will be understood that imaging device 220 can be configured to capture images with any temporal frequency, even continuously, for example with the use of a video camera.

Because meters such as electricity, water and gas meters are often installed in dimly lit places such as cupboards, imaging device 220 may include a source of illumination, e.g., one or more LEDs, such as white LEDs, so as to illuminate display 216 during imaging.

Images captured by imaging device 220 may be stored in a memory of processor 214, such as memory 120 shown in FIG. 1.

Cloud server 230 may be a remote server physically located in a different location from meter 210 and accessible via a communications network such as the internet. Cloud server 230 may be or may include a computing device 100 as shown in FIG. 1. Cloud server 230 may receive digital sensor data (e.g., derived from sensor 212) and one or more images captured by imaging device 220. Cloud server 230 may analyze digital sensor data using one or more software algorithms to identify trends in resource consumption and predict future usage of the resource. Cloud server 230 may identify leaks, back flows and other abnormalities in consumption of the resource based on analyzing digital sensor data received from meter 210. Cloud server 230 may use one or more optical character recognition (OCR) algorithms to identify and/or extract a consumption from the images captured of the display. This extracted consumption may be used to verify the accuracy of the digital sensor data and may be used to ensure data synchronization and reliability.

In some embodiments, cloud server 230 may use one or more captured images of the display to calculate a consumption in an interval of time for which sensor 212 was paused, e.g., during a period of time for which computer processor 214 was not converting the signals from sensor 212 into digital data. For example, server 230 may be configured to calculate a consumption of the resource during the interval based on the digital sensor data received before the interval and an image of the display at the end of the interval. The interval may be of a predetermined length, for example determined by processor 214. The interval length may be programmable by a human user, who may input a predetermined interval into meter 210 (e.g., via an input device 135 as shown in FIG. 1). The predetermined interval for which sensor 212 may pause the conversion of the sensed data into digital data may correspond to the length of the Jewish Sabbath.

Figure 3:
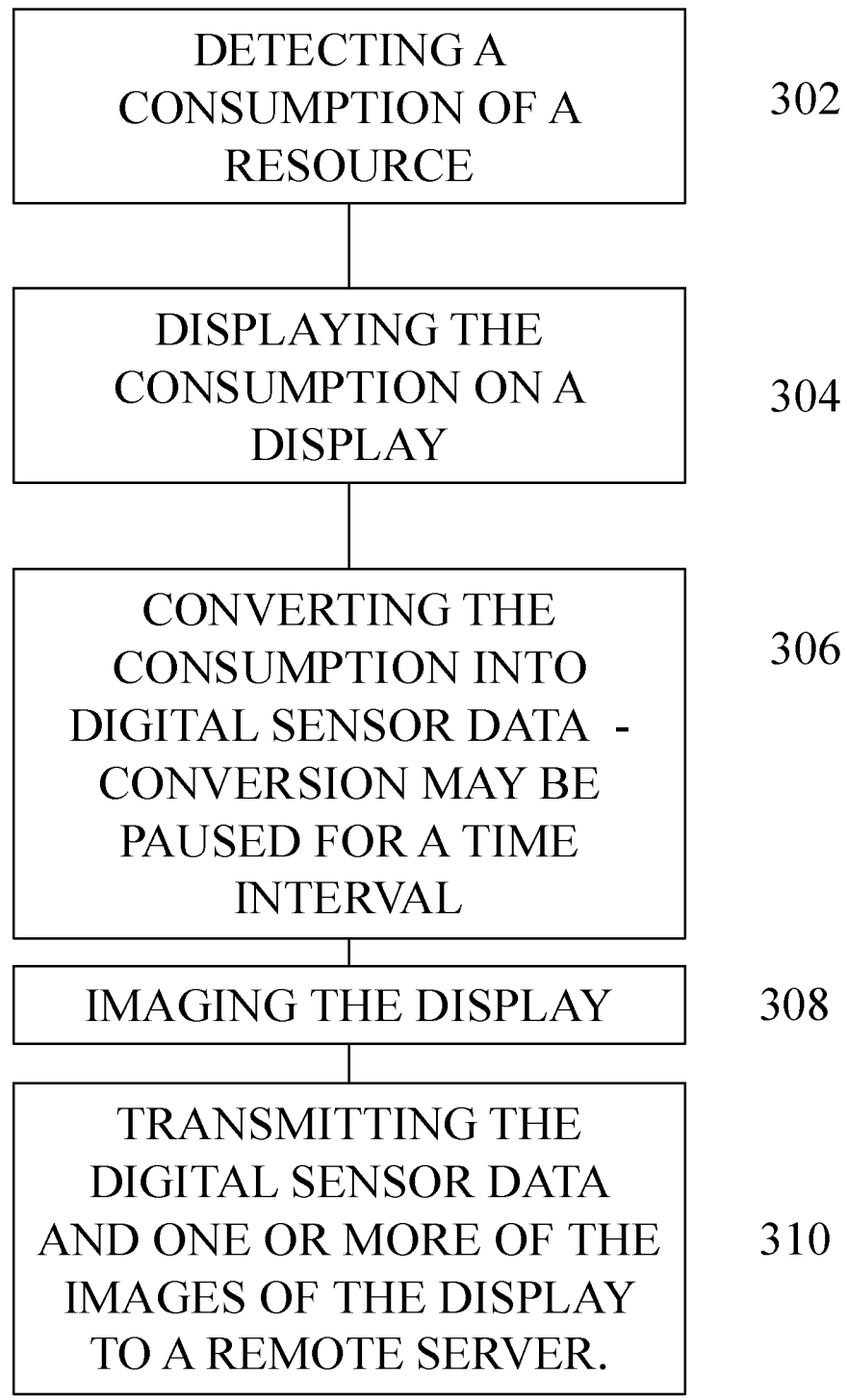
FIG. 3 is a flowchart of a method, according to some embodiments of the invention.

FIG. 3 shows a flowchart of a method 300, according to some embodiments of the invention. Method 300 may include detecting (302) a consumption of a resource. For example, the detecting may be performed using a sensor such as that in FIG. 2. According to some embodiments, the resource is one of water, electricity, energy, heating, cooling or gas.

Method 300 may include continuously detecting a consumption of the resource. For example, a sensing signal may be generated once every second or less so as to continuously sample the consumption of the resource.

Method 300 may include displaying (304) the detected/sensed consumption on a display, such as a display 216 of system 200 in FIG. 2. The display may be an electronic display, such as comprised of a number of seven-segment display LEDs, or a dot matrix display. In some embodiments, the display is a mechanical display, such as a vane display.

Method 300 may include converting (306) the consumption into digital sensor data. The converting may be performed by a processor/controller, such as controller 105 shown in FIG. 1. The digital sensor data may be time-stamped. According to some embodiments, method 300 includes pausing a continuous conversion of the detected signals into digital data for a predetermined interval. The predetermined interval may correspond to a projected downtime, such as for battery replacement, maintenance, or religious reasons. The predetermined interval may be any length of time, such as 1 minute, 1 hour, 12 hours, 24 hours, 36 hours, etc.

Method 300 may include imaging (308) the display. For example, the display may be imaged using an imaging device such as a camera (e.g., imaging device 220 of FIG. 2), which is configured to capture images of the display. The imaging may be performed periodically, e.g., once every 4 hours, or upon receipt of an instruction (e.g., as part of executable code 125 shown in FIG. 1). Imaging the display may provide a backup record of consumption for when detection or continuous detection is interrupted or is not available, for example due to battery depletion or when detection is paused (e.g., for the Jewish Sabbath).

According to some embodiments, method 300 includes imaging the display at an end of a predetermined interval for which signal conversion is paused. Method 300 may include imaging the display immediately before pausing the conversion. Consumption during the predetermined interval may be calculated based on such images taken before and/or after pausing conversion.

Method 300 may include transmitting (310) the digital sensor data and data describing one or more of the images of the display (such as the images themselves) and/or information read/decoded from the images of the display to a remote server. The digital sensor data and one or more images, and/or the information read/decoded from the images may be transmitted together at the same time or separately at different times. Digital sensor data and/or one or more images of the display may be transmitted periodically in accordance with bandwidth, battery, and/or any other physically limiting factor. For example, to conserve battery power, data and/or images may only be transmitted once per day, for example at just before midnight each day.

The remote server may analyze received data and/or images and/or image decoded information of the display. The analysis may be used for smart metering applications, such as billing, consumption trends, predicting future usage, identifying leaks, etc.

Method 300 may include using an optical character recognition (OCR) algorithm to identify and/or extract a meter reading captured in the one or more images taken of the display.

Method 300 may include calculating a consumption of the resource during the predetermined interval based on the digital sensor data received before the predetermined interval and an image of the display at the end of the predetermined interval.

Method 300 may include calculating the consumption of the resource also in the end-point. This may be achieved at the end-point (i.e., using a suitable processor, memory and power supply), so that calculation of the consumption of the resource may be carried out during the pausing interval also in the end point and not only in the remote server.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purposes only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention may be carried out or practiced in various ways and that the invention may be implemented in embodiments other than the ones outlined in the description above.

It is to be understood that the terms "including", "comprising", "consisting of" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for metering consumption of a resource, said system comprising:
   a sensor comprising a display and configured to:
      continuously sense a consumption of the resource;
      continuously display said consumption on the display; and
      continuously convert said consumption into digital sensor data;
   an imaging device configured to capture images of the display of the sensor; and
   a communications interface configured to transmit the digital sensor data and data describing one or more of the images of the display to a remote server,
   wherein the sensor is configured to continuously detect a consumption of the resource,
   wherein the continuous converting of said consumption into digital sensor data by the sensor can be paused for a predetermined interval,
   wherein the imaging device is configured to image the display at an end of the predetermined interval, and
   wherein the remote server is configured to calculate a consumption of the resource during the predetermined interval based on the digital sensor data received before the predetermined interval and an image of the display at the end of the predetermined interval.

2. The system of claim 1, comprising a processor configured to extract a consumption from one or more images of the display, wherein the data describing one or more of the images of the display comprises the extracted consumption.

3. The system of claim 1, wherein the remote server is configured to extract a consumption from the data describing one or more images of the display.

4. The system of claim 1, wherein the remote server is configured to extract a consumption from the data describing one or more images of the display using an optical character recognition (OCR) algorithm.

5. The system of claim 1, wherein the communications interface transmits the digital sensor data to the remote server at least once a day.

6. The system of claim 1, wherein the system is coupled to an existing resource consumption meter.

7. A method for resource consumption metering, the method comprising:
   continuously detecting a consumption of a resource;
   continuously displaying said consumption on a display;
   continuously converting said consumption into digital sensor data;
   continuously imaging the display; and
   transmitting the digital sensor data and data describing one or more of the images of the display to a remote server,
   wherein the continuously converting said consumption into digital sensor data can be paused for a predetermined interval,
   wherein the imaging of the display is carried out at an end of the predetermined interval, and
   wherein the remote server is configured to calculate a consumption of the resource during the predetermined interval based on the digital sensor data received before the predetermined interval and an image of the display at the end of the predetermined interval.

8. The method of claim 7, comprising extracting a consumption from one or more images of the display, wherein the data describing one or more of the images of the display comprises the extracted consumption.

9. The method of claim 7, further comprising extracting a consumption from the data describing one or more images of the display.

10. The method of claim 7, further comprising extracting a consumption from the data describing one or more images of the display using an optical character recognition (OCR) algorithm.

11. The method of claim 7, wherein the resource is one of gas, electricity, energy, heating, cooling or water.

* * * * *